United States Patent [19]

Richards et al.

[11] Patent Number: 4,518,175

[45] Date of Patent: May 21, 1985

[54] TUBULAR ASSEMBLY INCLUDING INSULATED CONDUITS AND COUPLERS FOR THE TRANSFER OF HIGH TEMPERATURE AND HIGH PRESSURE FLUIDS

[75] Inventors: William D. C. Richards; Harry Straub, both of King of Prussia, Pa.

[73] Assignee: General Electric Co., Philadelphia, Pa.

[21] Appl. No.: 375,839

[22] Filed: May 7, 1982

[51] Int. Cl.³ ............................................. F16L 59/14
[52] U.S. Cl. ..................................... 285/47; 138/149; 285/53
[58] Field of Search ...................... 285/47, 53, 333, 50; 138/149

[56] References Cited

U.S. PATENT DOCUMENTS

| | | | |
|---|---|---|---|
| 1,326,643 | 12/1919 | Burns .................................. | 285/333 |
| 1,909,075 | 5/1933 | Ricker et al. ...................... | 285/333 X |
| 2,054,118 | 9/1936 | Childs et al. ...................... | 285/333 X |
| 3,369,826 | 2/1968 | Boosey et al. ................... | 138/149 X |
| 3,511,282 | 5/1970 | Willhite et al. ..................... | 138/113 |
| 3,574,357 | 4/1971 | Alexandru et al. ................ | 285/47 |
| 3,775,989 | 12/1973 | Mursinna et al. ................. | 285/47 X |
| 4,130,301 | 12/1978 | Dunham et al. .................. | 285/47 |
| 4,219,224 | 8/1980 | Hanley .............................. | 285/47 |
| 4,340,245 | 7/1982 | Stalder .............................. | 285/53 |
| 4,396,211 | 8/1983 | McStravick et al. .............. | 285/47 |
| 4,415,184 | 11/1983 | Stephenson et al. ............. | 285/47 |

FOREIGN PATENT DOCUMENTS 532883  2/1958  Italy .................................... 285/333

*Primary Examiner*—Thomas F. Callaghan
*Attorney, Agent, or Firm*—Allen E. Amgott

[57] ABSTRACT

A tubular pipe assembly for hot or cold fluid transfer which assembly includes a plurality of insulated conduit sections joined together, end to end, with male and female couplings. Each conduit section has concentric inner and outer pipes with insulation disposed between the pipes. The outer pipes have threaded ends. A means at both ends of each conduit section seals the cavity between the inner and outer pipes and supports the pipes relative to each other. A male coupling has a first end threaded on the outer pipe of a first conduit section and has a second end which is threaded. A female coupling has a first and a second threaded end. The first threaded end of the female coupling is threaded on the outer pipe of a second conduit section. The second threaded end of the female coupling is threaded on the second end of the male coupling and thusly joins the first and second insulated conduits together. The male and female couplings have walls, intermediate their threaded ends, which are relatively thicker than the walls at the threaded ends thereof.

7 Claims, 2 Drawing Figures

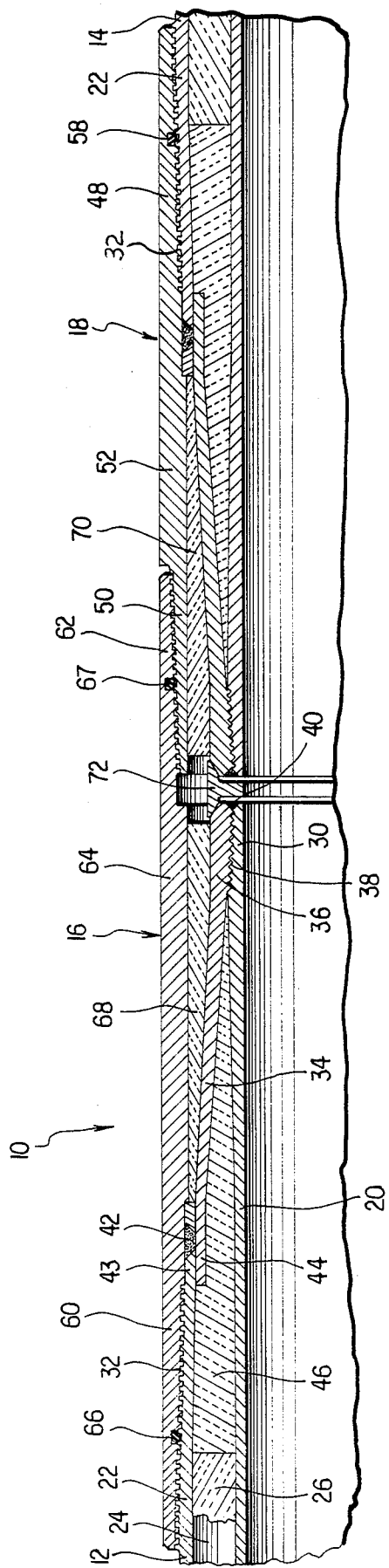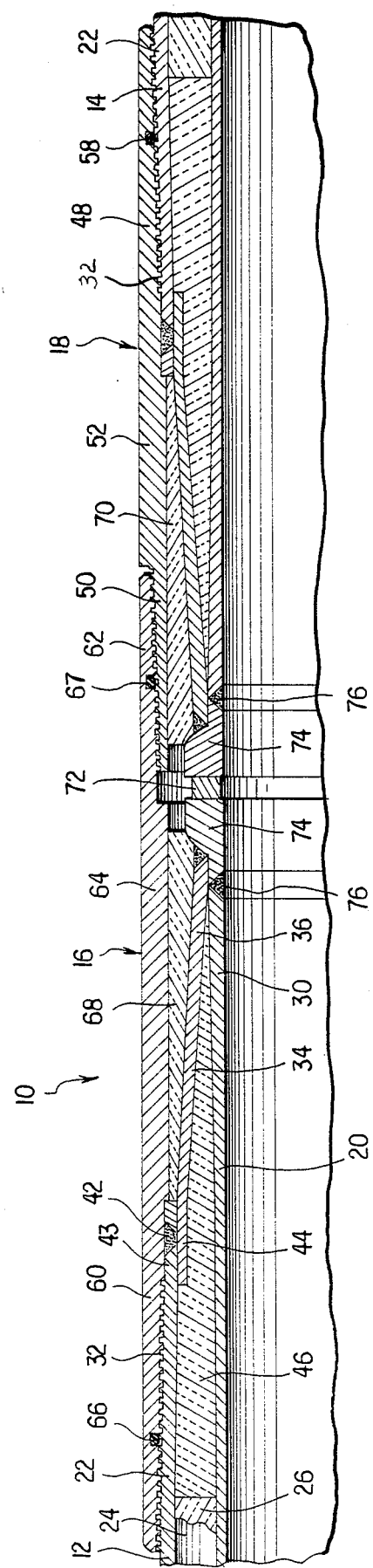

TUBULAR ASSEMBLY INCLUDING INSULATED CONDUITS AND COUPLERS FOR THE TRANSFER OF HIGH TEMPERATURE AND HIGH PRESSURE FLUIDS

BACKGROUND OF THE INVENTION

This invention relates generally to tubular pipe assemblies for hot or cold fluid transfer which assemblies include a plurality of insulated conduit sections and more particularly to a new and improved oil well casing assembly and coupler therefore, for oil well steam injection or above ground transport of process fluids under high pressure and elevated temperature. The assembly provides for a minimum heat and pressure loss, withstands multiple coupling and uncoupling operations in the field without deterioration of the insulated conduit sections, prevents the contamination of the insulation within the conduit sections if and when a coupling fails, provides for a relatively cool-threaded mechanical joint between the conduit sections and is capable of being readily repaired in the field.

In the past, attention was given primarily to insulating the hot process fluid from the surrounding environment during transport through a conduit, such as injecting steam through the conduit into an oil well. This was accomplished by inserting a smaller pipe within a larger diameter pipe and insulating the annular cavity between the pipes. The outer pipes usually had externally threaded ends so that an internally threaded coupling or sleeve would join two conduit sections together. The inner pipes were sealed from the environment by a seal. The transportation of a higher temperature fluid under a greater pressure with the ability to force more oil from the well created a problem relating to the thermal expansion and contraction of the inner pipe with respect to the outer pipe. One solution to this problem was to telescope the ends of the inner pipes relative to one another and allow enough space for the pipes to longitudinally expand. Another solution to this expansion/contraction problem was to prestress the inner pipe by heating it and immediately welding the expanded inner pipe to the outer pipe. A third solution employed two rigid members, usually frusto-conical in shape, at each end of the conduit which placed the inner pipe under compression or tension, depending on whether the pipe would carry hot or cold process fluids. The frusto-conical member translates the tension/compression forces, generated by the contraction/expansion of the inner pipe to the outer pipe. These developments focused upon the dynamics of the pipes within the insulated conduits, vis-a-vis, the temperature of the process fluids. The art did not address the problems relating to the joining of the insulated conduit sections. An internally threaded coupling or sleeve was used to join the insulated conduit sections in conjunction with most of the above-described devices. This joining was accomplished by manipulating the conduit sections and the single coupling at the site of the oil well with field tools or oil well rig tongs. The manipulation of the outer pipes of the insulated conduit section caused the outer pipes to deteriorate after multiple coupling and uncoupling operations. The heat loss through the single coupling lowered the over-all efficiency of the tubular assembly and the transfer of heat through the single coupling hastened the deterioration of the coupling threads and the outer pipe threads.

A primary objective of the present invention is, therefore, to provide an improved high temperature and high pressure tubular pipe assembly which includes a plurality of insulated conduit sections joined together by male and female couplings for transporting hot process fluids and which assembly minimizes the loss of heat and pressure through the tubular assembly and withstands multiple coupling and uncoupling operations in the field without deterioration of the outer pipes of the insulated conduit sections. The male and female couplings are directly manipulated by the field tools or oil well rig tongs during the coupling and uncoupling operations rather than the conduit sections being manipulated by the tools.

Another object of the present invention is to provide a tubular assembly wherein the mechanical, threaded joint between the male coupling and the female coupling, which join two conduit sections together, is thermally insulated from the hot process fluids which are transported through the inner pipes.

Another object of the present invention is to provide a joint between two conduit sections that can withstand the additional forces developed by the expansion and contraction of the inner pipes which carry the process fluids.

Another object of the present invention is to provide a male and female coupling for insulated conduit sections which couplings do not affect the integrity of the insulation within the conduit sections if and when the male or female coupling fails.

Another object of the present invention is to provide a tubular assembly with a coupling wherein the coupling can be repaired in the field.

SUMMARY OF THE INVENTION

The present invention, in accordance with one embodiment thereof, comprises a high temperature and high pressure tubular pipe assembly which includes a plurality of insulated conduit sections joined together, end to end, with male and female couplings. Each conduit section has concentric inner and outer pipes with insulation disposed within the annular cavity between both pipes. The ends of the inner pipes extend longitudinally beyond the ends of the outer pipes. Each end of the outer pipe has an external thread and has an end surface. The annular cavity between the inner and outer pipes is hermetically sealed proximate each end of the conduit section by a frusto-conical member. One end of the frusto-conical member is sealingly joined with threads and a weld to the end of the inner pipe and the other end of the frusto-conical member is sealingly joined to the end surface of the outer pipe.

The male coupling has a first end internally threaded, which matches the external threaded end of the outer pipe of the first conduit section, and a second end which is externally threaded. The female coupling has a first and a second end internally threaded. The first end of the female coupling is threaded on the outer pipe of the second conduit and the second end is threaded on the second end of the male coupling and thusly joins the first and second insulated conduit section. The walls of the male and female couplings, intermediate both threaded ends thereof, are thicker than the threaded ends.

BRIEF DESCRIPTION OF THE DRAWINGS

FIG. 1 is a cross-sectional view of a portion of a tubular pipe assembly which includes a first and a second insulation conduit section and a male and female coupling as one embodiment of the present invention.

FIG. 2 is a cross-sectional view of a portion of a tubular pipe assembly which includes a first and a second insulated conduit section and a male and female coupling and further includes end rings as an alternative embodiment of the present invention.

DESCRIPTION OF THE PREFERRED EMBODIMENT

Referring now to FIG. 1, there is shown a tubular assembly pipe 10 with a first insulated conduit section 14 and second insulated conduit section 12 joined together by a female coupling 16 and a male coupling 18. The tubular assembly can be made of a plurality of conduit sections in a manner to be described hereinafter to establish a system for transporting fluids, particularly high or low temperature and high pressure fluids over long distances with relatively low heat loss and without significant leakage. Each conduit section is substantially the same, having female coupling 16 at one end thereof and male coupling 18 at the opposing end thereof.

Each conduit section 12, 14 includes an inner pipe 20 which is concentric with an outer pipe 22. An annular cavity 24 is defined between the inner pipe 20 and the outer pipe 22. A first type of insulation 26 is disposed within the cavity 24. The externally threaded ends 30 of the inner pipe 20 extend longitudinally beyond the corresponding externally threaded ends 32 of the outer pipe 22. The inner pipe 20 has externally upset ends 30, according to the American Petroleum Institute standards, in that the ends 30 are relatively thicker than the intermediate walls.

The inner pipe 20 is supported in a spacial relationship with outer pipe 22 by frusto-conical member 34 at each end of the conduit sections. The frusto-conical member 34 is tapered with the thicker portion thereof 36 being threadably joined at 38 and hermetically sealed by a weld 40 to the end 30 of the inner pipe 20. The generally axial, thinner portion 44 of the tapered frusto-conical member 34 is hermetically sealed by a weld 42 to the end surface 43 of the outer pipe 22. The frusto-conical member 34 supports and positions the inner pipe 20 relative to the outer pipe 22. The frusto-conical member 34 may support the inner pipe 20 in a state of tension and the outer pipe 22 in a state of compression. The frusto-conical member 34 also translates the forces created by the expansion of the inner pipe 20, which is placed in compression, to the outer pipe 22, which is in tension, and hermetically seals the annular cavity 24 which insures the integrity of the first type of insulation 26 therein. A more complete description of the function of frusto-conical member 34 is found in co-pending U.S. patent application Ser. No. 257,547, now U.S. Pat. No. 4,415,184 entitled "High Temperature Insulated Casing", Brown et al., the subject matter of which is incorporated herein by reference.

A second type of insulation 46, which has better thermal insulation qualities than the first type of insulation 26, is disposed beneath the externally threaded end 32 of the outer pipe 22 and between the frusto-conical member 34 and the inner pipe 20. The second type of insulation 46 allows greater heat to be used in welding the frusto-conical member 34 to the outer pipe 22 and to the inner pipe 20, as well as in welding other components of the tubular pipe assembly. The transitioning geometry of the frusto-conical member functions as a thermal dam which retards transfer of thermal energy from the inner to the outer pipe. This feature, in addition to insulation 26, 46, 68, 70 provides that the threaded ends 32 of outer pipe 22 will experience substantially lower temperatures than inner pipe 20 which is at substantially the process fluid temperature level. Therefore, the potential of thread failure due to galling caused by high contact pressures in combination with high temperatures will be greatly diminished thereby enhancing the life and reliability of the threaded assembly.

The male coupling 18 has a first end 48 internally threaded which matches the externally threaded end 32 of outer pipe 22. The second end 50 of the male coupling 18 is externally threaded. The walls 52, intermediate the first and second threaded ends 48, 50 of the male coupling 18, are relatively thicker than the threaded ends 48, 50. The male coupling 18 may be threadably joined to the outer pipe 22 of the first insulated conduit section 14 at the time of manufacture of the insulated conduit section under optimum conditions of cleanliness using a high temperature anti-galling thread lubricant. A first ring seal 58 is disposed in a groove between the male coupling 18 and the outer pipe 22 to prevent leakage of the process fluids being transferred through the inner pipe into the environment.

The female coupling 16 has first end 60 and a second end 62, both internally threaded. The walls 64 of the female coupling 16 intermediate both first and second threaded ends 60 and 62, are thicker than the threaded ends 60, 62. The first end 60 of the female coupling 16 is threadably joined to the end of the outer pipe of the second insulated conduit section 12. A second ring seal 66 is disposed in a groove between the female coupling 16 and the outer pipe 22 to prevent leakage of the process fluids into the environment. As is the case with the male coupling 18, the female coupling 16 is preferably joined to the end of the conduit section opposite the end with the male coupling 18 at the time of manufacture. A third ring seal 67 is disposed in a groove between the female coupling end 62 and the male coupling end 50 to prevent leakage of the process fluids into the environment. This last joint assembly is completed in the field during deployment.

In addition, a third type of insulation 68 may be placed between female coupling 16 and the adjacent frusto-conical member 34 and the third type of insulation 70 may be placed between male coupling 18 and the adjacent frusto-conical member 34. This third type of insulation 68, 70 may be a pourable or caulking-like material.

The first and second insulated conduit section 14 and 12 are joined together in the field by mating the second end 62 of the female coupling 16 to the second end 50 of the male coupling and applying the requisite rotational force between the female coupling 16 and the male coupling 18. Ideally, the field tools used for applying these rotational forces, such as well rig tongs, are applied directly to the thick wall portions 64 the female coupling 16 and thick wall portions 52 of the male coupling 18. These heavy walled male and female couplings can withstand multiple coupling and uncoupling operations without affecting the integrity of the outer pipes on each of the first and second insulated conduits 14 and 12. The male and female couplings 18 and 16 have walls which are relatively thicker than the walls of the outer pipe 22 to withstand occasional abuse from tongs, hammer, etc. As the end 50 of male coupling 18 is stabbed into threaded end 62 of female coupling 16, all wrenching is performed directly on the thick wall 52 of the male coupling, and not on the outer pipe 22 of insulated conduit section 14. Should additional force be required to torque the threads, the added reaction force can be applied directly to the rugged wall of the female coupling 16, not to the outer pipe of insulated conduit section 12. Thus, the ruggedness of coupling 16, 18 adds reliability and tends to extend the life of the tubular assembly 10.

If and when the mechanical joint between female coupling 16 and male coupling 18 becomes damaged, the tubular assembly 10 can be servered by cutting the female coupling 16 or the male coupling 18 or by disconnecting the other threaded joints between the outer pipes and the female coupling 16 or male coupling 18. During this particular disassembly operation, the integrity of the first type of insulation 26, within the first and second conduits 14 and 12, is not affected in any appreciable fashion. The conduit section 12 and 14 could be repaired by replacing the male coupling 18 and/or the female coupling 16 in the field. In an oil well operation, the mechanical joint between female coupling 16 and male coupling 18 can bear the weight of the entire tubular assembly or well string.

Additionally, to prevent the process fluids from leaking into the environment, a primary seal 72 is placed between the inner pipes 20 of the first and second insulated conduit sections 14 and 12. The primary seal 72 provides for a communicating passage through the inner pipes and seals the process fluids within the inner pipes.

FIG. 2 shows an alternate embodiment wherein the frusto-conical member 34 and the inner pipe 20 are supported by end ring 74. The end ring 74 is hermetically welded to end 36 of the frusto-conical member 34 and is similarly welded at 76 to the inner pipe 20. In all other aspects, the structures of FIG. 1 and 2 are similar with similar parts designated by the same reference numerals.

It is to be understood that this invention is not limited to the particular embodiment disclosed and it is intended to cover all modifications coming within the true spirit and scope of this invention as claimed.

We claim:

1. A pipe assembly comprising:
    a first conduit having an inner pipe for conveying fluids and an outer pipe surrounding the inner pipe and defining an annular cavity therebetween, said outer pipe having threaded ends and said inner pipe having its ends extending outwardly well beyond said outer pipe threaded ends;
    frusto-conical members joining corresponding ends of said inner and outer pipes for sealing the cavity and supporting said pipes in spacial relationship;
    a male coupling having a first threaded end sized to engage one threaded end of the outer pipe, and a second threaded end; and
    a female coupling having a first threaded end sized to engage the other end of the outer pipe and a second threaded end sized to engage the second threaded end of said male coupling.

2. The pipe assembly of claim 1 wherein theinner pipe has ends which extend outwardly beyond the corresponding ends of the outer pipe, said means for sealing the cavity comprises a pair of frusto-conical members, one sealingly joined to each end of said outer pipe, and further comprising a pair of end rings, one sealingly connected between each frusto-conical member and thecorresponding end of the inner pipe.

3. The pipe assembly of claim 1 wherein each said frusto-conical member has decreasing thickness in the radially outward direction.

4. The pipe assembly of claim 1 further comprising a second conduit similar to said first conduit and wherein:
    the first threaded end of said male coupling is threaded onto one end of the outer pipe of said first conduit;
    the first threaded end of said female coupling is threaded onto the other end of the outer pipe of said second conduit; and
    said male and female couplings are threadedly engaged at their respective second threaded ends.

5. The pipe assembly of claim 1 further comprising first insulation means disposed within said cavity, and second insulation means disposed between said frusto-conical members and said inner pipe, said second insulation means having better thermal insulating qualities than said first insulation means.

6. The pipe assembly of claim 5 wherein a third insulation means is disposed between said frusto-conical members and said male and female couplings.

7. The pipe assembly of claim 4 further comprising a first ring seal between said female coupling and the outer pipe of said first conduit, a second ring seal between said male coupling and the outer pipe of said second conduit, and a third ring seal between said male and female couplings.

* * * * *